June 13, 1939.  P. J. MUSOLF  2,161,881
BEATER
Filed Oct. 8, 1936
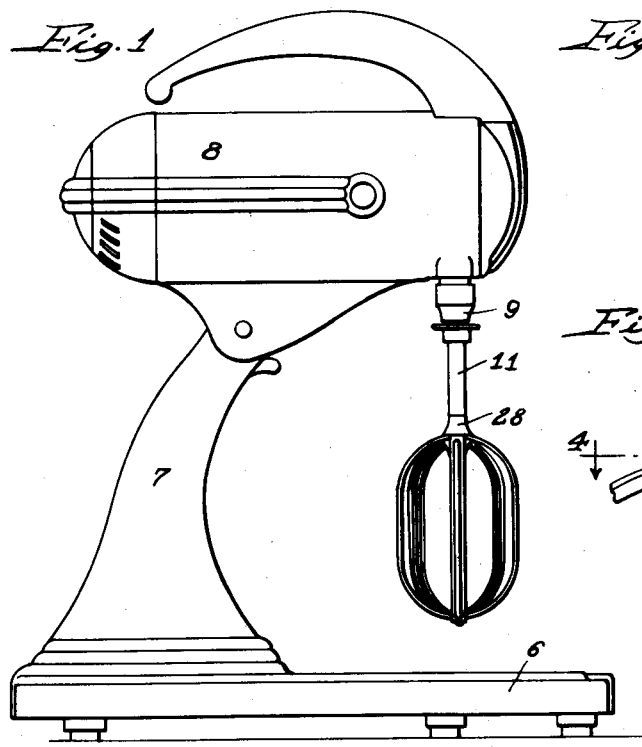
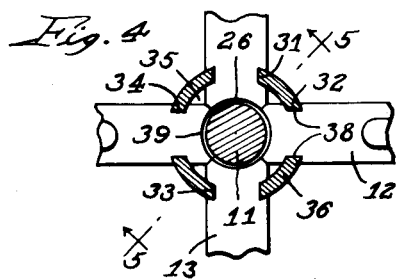
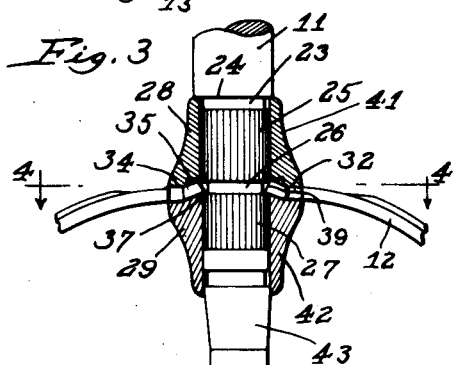
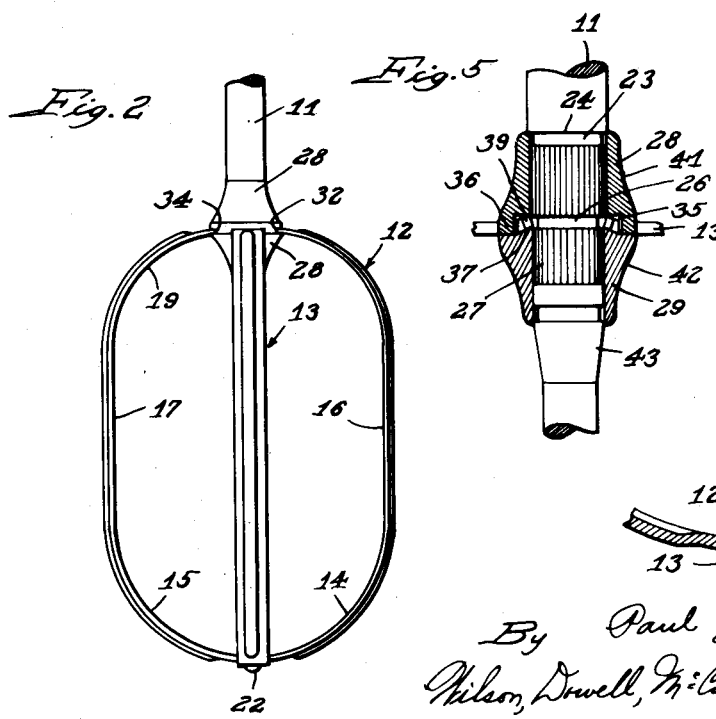
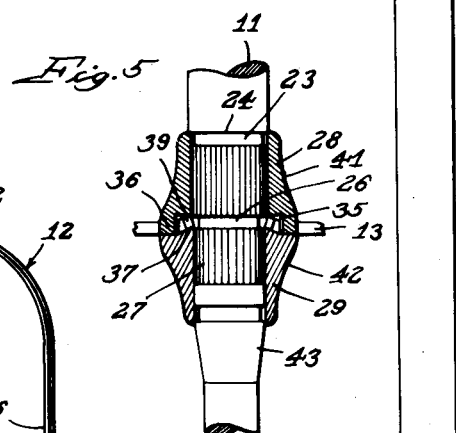
Inventor:
Paul John Musolf
By Wilson, Dowell, McCanna & Peintereoin
Attys Patented June 13, 1939

2,161,881

UNITED STATES PATENT OFFICE 2,161,881

BEATER

Paul John Musolf, Chicago, Ill., assignor to Chicago Flexible Shaft Company, Chicago, Ill., a corporation of Illinois Application October 8, 1936, Serial No. 104,597

8 Claims. (Cl. 259—131)

This invention relates to mixing devices and has particular reference to a beater member of improved construction.

The beater of this invention is designed primarily for use in household food mixers but is not necessarily so limited. With such mixers it is important that the beaters be capable of being easily cleaned. The beaters are frequently used successively for different jobs and must be rapidly cleaned between times. Furthermore, with beaters of the type wherein the blades are fastened to a shaft there is a tendency for food to accumulate in the recesses and inaccessible places, and there under the influence of bacterial action to become highly objectionable. To the best of my knowledge these objectionable features have been universally present in prior art beaters of the type mentioned. This has been due largely to two factors, the first being that the means for attachment of the blades to the shaft provides recesses and sharp angles which are difficult to clean, and secondly, the size and shape of the beater blade has been such as to make the cleaning operations particularly difficult.

Among the primary purposes of the invention is the provision of a beater constructed for easy and thorough cleaning and for rapid and relatively complete removal of the material from the blades, and the provision of a beater having improved mixing efficiency, greater strength, and lower manufacturing costs.

Other objects and advantages will be apparent from the following description and the accompanying drawing, in which—

Figure 1 is a side view of a household mixer having beaters embodying my invention;

Fig. 2 is a full sized view of the lower end of the beater;

Fig. 3 is a fragmentary section through the lower end of the beater, shown in double size;

Fig. 4 is a section on the line 4—4 of Fig. 3, and

Fig. 5 is a section on the line 5—5 of Fig. 4.

I have herein shown the invention embodied in a beater for household food mixers of well known type having a base 6, pedestal 7 thereon adapted to support a casing 8 containing a motor and having drive spindles 9 to which the beaters are releasably attached so that they may be removed for cleaning purposes.

Each of the beaters consists of a shaft designated generally by the numeral 11 adapted to be driven from its upper end. Attached to the lower end of the shaft is a pair of beater blades 12 and 13, each of which consists of a strip of metal, preferably sheet metal as shown in this instance, though not necessarily so. These strips are attached to the lower end of the shaft 11 at a point substantially midway between their ends. The strip is then bowed outwardly and upwardly on each side of the shaft as shown at 14 and 15, extends upwardly along and substantially parallel with the shaft as shown at 16 and 17, and then bows inwardly as shown at 18 and 19 so that the ends of the strip rest adjacent the shaft at a point spaced upwardly from the lower end of the shaft. As a part of my invention I prefer to make these loops relatively long as compared with their width, and preferably the length of the loop should be at least one and one-half times the width, which shape characteristic cooperates with other features of the invention presently to be described to facilitate the cleaning of the beater. The strips 12 and 13 are attached to the shaft at right angles and are identical in shape and size. The lower end of the shaft 11 has a knurled portion 21 of reduced diameter adapted to have a press fit into openings of the blades 12 and 13, the lower end of the portion 21 being bored and the annular wall thus formed being riveted over as shown at 22 for the purpose of securing the blades to the lower end of the shaft, the riveted portion 22 pressing the blades firmly against the shoulder formed by the portion 21.

The shaft 11 also has a recess 23 forming a shoulder 24 and below the recess 23 a knurled portion 25 of slightly smaller radius than the upper end of the shaft 11. An annular recess 26 is formed at the lower edge of the knurled portion 25 beyond which is a second knurled portion 27 of slightly smaller radius than the knurled portion 25. The knurled portions 25 and 27 serve to receive with a press fit a pair of ferrules 28 and 29, the upper edge of the upper ferrule 28 abutting against the shoulder 24, and the upper edge of the ferrule 29 abutting against the lower edge of the ferrule 28 so as to provide a tight close fitting joint therebetween. Slots 31, 32, 33 and 34 are formed radially in the lower edge of the ferrule 28 at angles of 90°. Likewise, the lower edge of the ferrule has an annular recess 35 adjacent its central bore providing an annular discontinuous wall 36 against which the upper edge of the ferrule 29 abuts. The ferrule 29 has an annular boss 37 directly adjacent its bore which fits into the annular recess 35 when the ferrules are brought into operative position.

The ends of the blades 12 and 13 are provided with slots 38 at their opposite edges to permit the strips to fit into the radial slots 31, 32, etc., the slots 31, 32, etc. being of lesser width than the width of the blades. The ends of the blades are arcuate in shape as shown at 39 so as to abut against the shaft 11 in the annular recess 26 as best shown in Fig. 3. It will be seen from Fig. 3 that when the ferrules 28 and 29 are forced together into their operative position the boss 27 forces the extreme ends of the blades upwardly into the recess 35 and this, together with the interlocking slots 38 on the blade and 31, 32, etc. on the ferrule 28, serves to securely hold the ends of the blades 12 and 13 in the required positions.

The outer surface of the ferrule 28 is gradually sloped outwardly as shown at 41 from the surface of the shaft 11 to the lower edge thereof abutting the ferrule 29. Likewise, the ferrule 29 is gradually sloped inwardly as shown at 42 substantially to the surface of the shaft 11. At the lower edge of the ferrule 29 the shaft 11 is gradually reduced in diameter as shown at 43 essentially for the purpose of reducing the weight of the beaters.

A feature of the construction is the close fit between the two ferrules and the associated ends of the beater blades. In order to accomplish this it is advisable to so form the ends of the blades that they are slightly oversize, whereby when the ferrules are brought together with the ends of the beater blades in position the metal is caused to flow somewhat under the high pressure so as to completely fill the slots in the ferrule and thereby avoid the presence of openings along the junction of the metal.

Attention is directed particularly to the novel manner in which the ends of the blades are attached to the shaft 11. This arrangement produces a very rigid support for the ends of the blades which is enhanced by the fact that the shaft extends through the loop of the blades and is fastened to the blades at the lower end of the loop. This combination produces extreme rigidity and strength in the beaters.

Attention is also directed to the fact that this attaching means provides no inaccessible points for the deposit of food such as the material being mixed by the beaters. Because of the sloping outer face of the ferrules, which slope is on a relatively long radius, this part of the beater is very easily accessible and may be wiped with the usual disk washing cloth without inconvenience. This is of particular merit in the lower ferrule 29. However, in order to render the inner side of the beater blades accessible, the blades themselves are so shaped that the length of the loops is at least one and one-half times the width thereof which gives room for the insertion of the fingers with the usual dish washing cloth so that the inner sides of the blades may be washed without difficulty. Likewise, it permits easy accessibility to the ferrule 29 and to the junction between the ferrule and the blades.

Attention is also directed to the fact that the presence of opposed ferrules on opposite sides of the beater blades imparts a junction therebetween of relatively long radius, thereby rendering this junction point easily accessible for washing as compared with a sharp angle of small radius directly adjacent the shaft.

While I have thus described and illustrated the specific embodiment of my invention for purposes of illustration, I do not wish to be limited except as required by the prior art and the scope of the appended claims, in which—

I claim:

1. The combination in a beater for household mixers of a shaft, a beater blade comprising a metal strip attached substantially midway between its ends to the end of said shaft and bowed outwardly and upwardly along said shaft, the ends being bowed inwardly toward said shaft, and means for attaching the ends of said strip to the shaft comprising abutting ferrules on said shaft, the ferrules sloping outwardly from the surface of the shaft at their opposed free edges in a smooth arcuate surface to the abutting edges whereby to provide a smooth outwardly flared attaching means for easy cleaning, one of said ferrules having slots along the abutting edges to receive and clamp the ends of said strip.

2. The combination in a beater of the type having a shaft and a beater blade in the form of a loop of strip material, of means for attaching the ends of said loop to the shaft comprising abutting ferrules having a press fit on said shaft, one of said ferrules having an annular recess adjacent the shaft and radially disposed slots for the reception of the notched ends of said loop, the other of said ferrules having an annular boss adjacent said shaft positioned to be received in said annular recess whereby to distort the ends of said loop into said recess when the ferrules are moved into abutting relationship.

3. The combination in a beater of a shaft, a pair of beater blades comprising metal strips attached substantially midway between their ends to the end of said shaft at substantially ninety degrees with respect to each other, the strips being bowed outwardly and upwardly along said shaft and the ends being bowed inwardly toward said shaft at substantially the same curvature to form loops, and means for attaching the ends of said strips to the shaft comprising abutting ferrules on said shaft, the ferrules sloping outwardly on an arc of relatively long radius from the surface of the shaft at their opposed free edges to the abutting edges whereby the abutting edges of the ferrules are of greater thickness than the free edges thereof, one of said ferrules having radial slots for the reception of the ends of said strips to clamp the same rigidly in position.

4. An agitator for food mixers, embodying a shaft, a strip of material bowed into a suitable shape, said strip having free ends, means for anchoring said strip intermediate its ends to said shaft, a collar on the shaft, and interlocking means between the said free ends of said strip and said collar for maintaining said strip in its bent shape, the said interlocking means embodying recesses in the edge of said strip, and seats in the collar, the said recesses in the ends of the strip being shaped to fit in said seats, the strip being biased away from the seats whereby the ends of the strip will be held against displacement by the recesses being held tightly against the edge of the seat.

5. An agitator for food mixers, embodying a shaft, a metal band anchored intermediate its ends and bowed to create a tension therein, a collar secured to the shaft and provided with a seat opening through one end, the wall of said seat having recesses opening through the end thereof, the free ends of said band being headed, the said headed ends entering and seated in respective recesses and being biased away from the notches whereby the ends of the band will be held against displacement by reason of said heads being held against the edge of the recesses, a second collar on the shaft and between which collars the ends of the said band are disposed, and means for securing the collars against separation.

6. An agitator for food mixers embodying a shaft, a metal band anchored at a point considerably remote from one end and bowed to create a tension therein, a collar secured to the shaft and provided with a seat opening through one end, the wall of said seat having a recess opening through the end thereof, the free end of said band being shaped to form a head, the free end of said band entering and seated in said recesses and said head being biased away from the recess whereby the end of said band will be held against displacement by the head being held tightly against the edge of the recess, and means for maintaining the said headed end of the band against becoming unseated from said recess.

7. An agitator for food mixers embodying a shaft, a metal band anchored intermediate its ends to said shaft and bowed to create a tension therein, notches in the lateral edges of the band adjacent its free ends, a collar secured to the shaft and provided with a hollow portion opening through one end thereof, and into which recesses the respective notched ends of said band are seated, the ends of said band being of a width greater than the width of the respective recesses in which they are seated whereby the lateral edges of the recesses will enter the said notches to anchor the free ends of the band to the shaft and in order that the ends of the band are biased away from the recesses, whereby the ends of the band are held against displacement by the notched portions being held tightly against the edge of the recesses, and means for maintaining the ends of the band against becoming unseated from said recesses.

8. An agitator for food mixers embodying a shaft, a flexible band, means anchoring the band to said shaft remote from an end of the band, said band being bent to form a curve, a collar secured to the shaft, said collar provided with a seat opening through one end thereof, there being a recess in the wall of said seat the said end of the band being provided with a shoulder and seated in said recess, the tension created in said band by being bent causing the band to be biased away from the seat in order that the end of the band will be held against displacement by the shoulder being held tightly against the edge of said seat, and means cooperating with said collar and serving to maintain the said end of the band against displacement with respect to said seat.

PAUL JOHN MUSOLF.